UNITED STATES PATENT OFFICE.

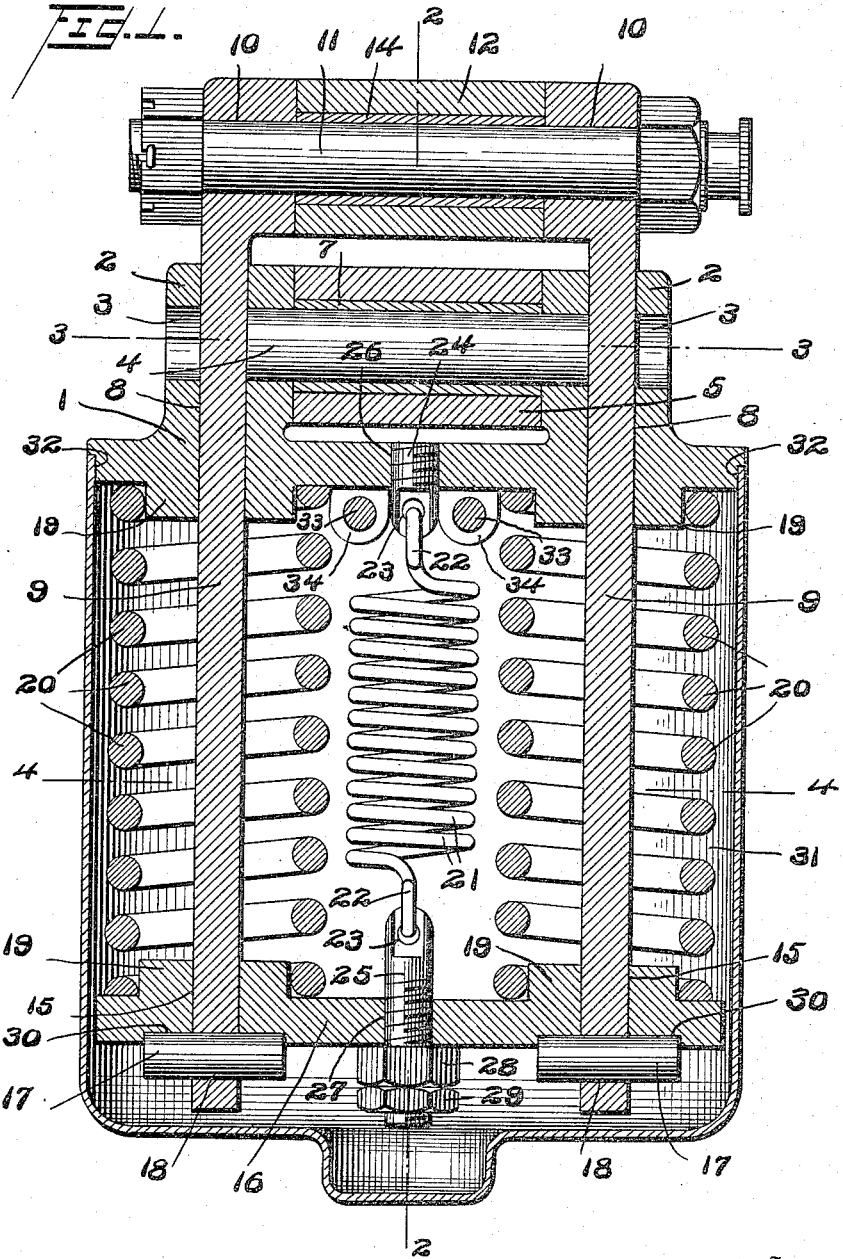

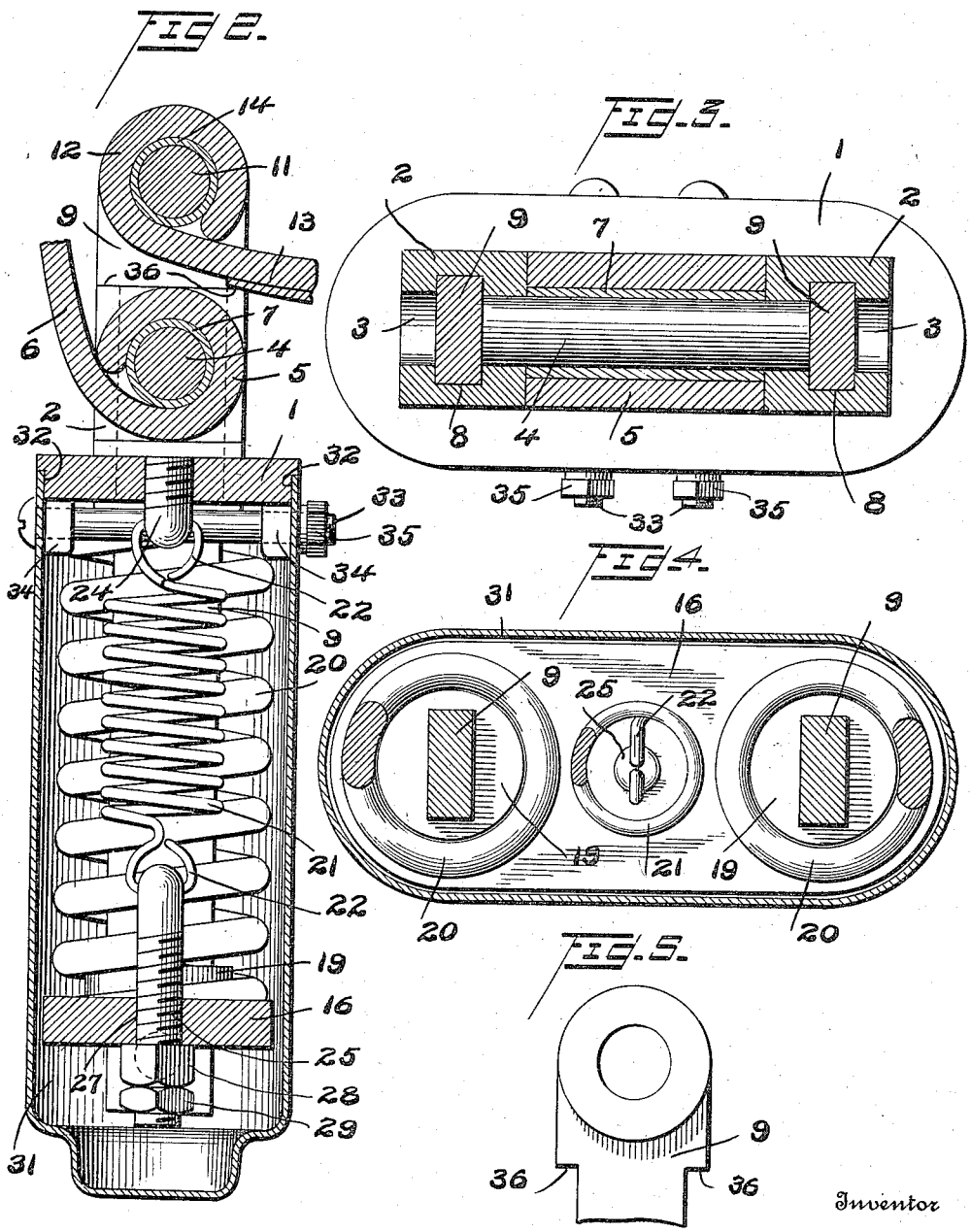

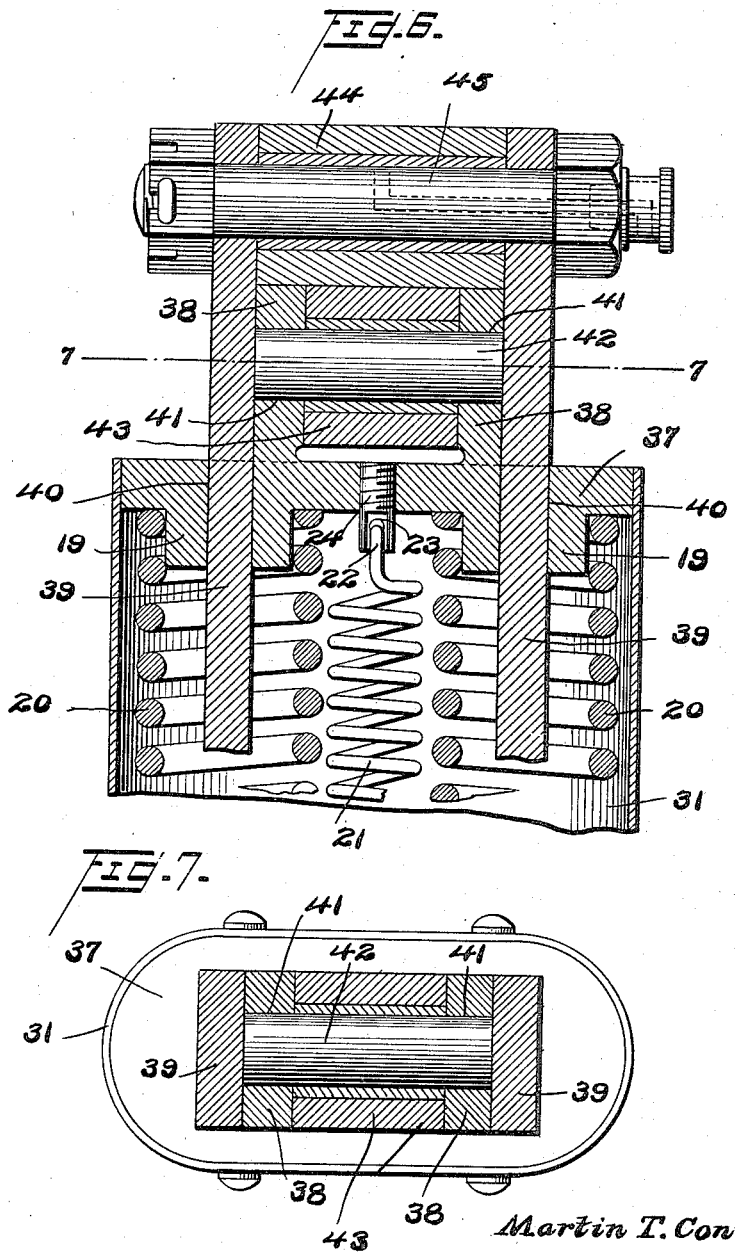

MARTIN T. CONVERY, OF PHILADELPHIA, PENNSYLVANIA, ASSIGNOR OF ONE-HALF TO VINCENT P. PADULA, OF PHILADELPHIA, PENNSYLVANIA.

SHOCK-ABSORBER.

1,160,381. Specification of Letters Patent. Patented Nov. 16, 1915.

Application filed March 5, 1914. Serial No. 822,752.

*To all whom it may concern:*

Be it known that I, MARTIN T. CONVERY, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, and more particularly to a combined shock absorber and rebound controlling device, the object of the invention being to provide an elastic connecting medium between two members of an elliptical spring or between a spring and a fixed member of a vehicle frame so that the varying movement of the spring will be cushioned so as to prevent undue vibration and jar.

A further object is to provide a device of the character stated which may be connected to any ordinary vehicle, but which is primarily designed for use in connection with automobiles, and which will be readily placed in position and efficiently perform the functions for which it is intended.

With these and other objects in view, the invention consists in certain novel features of construction and combinations and arrangements of parts as will be more fully hereinafter described and pointed out in the claim.

In the accompanying drawings: Figure 1 is a view in longitudinal section illustrating my improvements. Fig. 2 is a view in longitudinal section on the line 2—2 of Fig. 1. Fig. 3 is a view in horizontal section on the line 3—3 of Fig. 1. Fig. 4 is a view in horizontal section on the line 4—4 of Fig. 1. Fig. 5 is a fragmentary view in elevation of the upper end of one of the supporting bars. Fig. 6 is a fragmentary view in section similar to Fig. 1, but showing the upper portion only of a shock absorber embodying a modification of my invention, and Fig. 7 is a view in horizontal section on the line 7—7 of Fig. 6.

1 represents a head which is preferably of general elliptical shape in plan, and which is provided on its upper face with upwardly projecting lugs 2 having alined openings 3 extending transversely through the lugs and adapted to receive a pin 4 which constitutes a coupling medium between the head and an eye 5 on one end of a spring member 6.

A tubular bushing 7 is interposed between the eye 5 and the pin 4 to take up wear, and afford a neat juncture of the parts. The lugs 2 are provided with longitudinal openings 8 which extend all the way through the lugs and through the head 1. In these openings 8, parallel supporting bars 9 are positioned, and as the openings 8 intersect the openings 3 in the lugs, the bars 9 when in position operate to hold the pin 4 against possibility of longitudinal movement.

In assembling the parts, it is of course necessary to place the pin 4 in position before the bars are projected through the head. The upper ends of the bars 9 are provided with alined openings 10 for the reception of a bolt 11 which is projected through the eye 12 of a spring member 13, a bushing 14 being inserted between the eye and the bolt as a mechanical expedient.

The bars 9 at their lower ends are projected through openings 15 in a cross bar 16, and pins 17 project through openings 18 in the lower ends of the bars 9 and hold the cross bar 16 and supporting bars 9 together as will be more fully hereinafter described.

The head 1 and the cross bar 16 are provided on their opposed faces adjacent their ends with circular enlargements 19 projecting into the ends of coiled springs 20, said springs 20 being relatively strong and operating as expansion springs to force the head 1 and bar 16 apart.

Between the coiled springs 20, I locate a contraction spring 21 which latter is, as compared to the springs 20, relatively weak, and is provided at its ends with hooks 22 which are projected through eyes 23 in the inner ends of threaded pins 24 and 25 respectively. The upper pin 24 is located in a threaded opening 26 in the center of head 1, and is relatively short. The lower pin 25 extends through a threaded opening 27 in the center of bar 16, and is relatively long having on its outer ends nuts 28 and 29 to permit adjustment of the pin, and ends of the spring and lock the parts against movement after adjustment.

The pins 17 above referred to are normally positioned in recesses 30 in the lower face of bar 16. These recesses conform in length to the length of the pins, and while the pins may be readily inserted and withdrawn when springs 20 are compressed, when said springs 20 are permitted to expand, they will securely hold the pins in their recesses and prevent any possibility of disconnection.

All of the parts below the head are confined in a removable casing 31 which, at its upper edge, fits in a groove 32 in the outer wall of the head, and is secured by bolts 33. These bolts 33 extend through registering openings in the casing and in lugs 34, the latter preferably integral with the head and located inside of the casing. Nuts 35 are screwed onto the bolts and securely hold the casing in place, yet permit of its removal whenever desired.

While, of course, my invention is not limited to the exact shape of the bars 9 in cross section, yet I preferably form these bars of general oblong shape, and at their upper ends form the bars with shoulders 36 which engage the upper ends of the lugs 2 and limit the movement of the bars by the springs. This is primarily efficacious when the device is not coupled to any vehicle, but in ordinary use the shoulders will be away from the lugs as soon as any weight or strain is had upon the shock absorber.

In the modification illustrated in Figs. 6 and 7, I provide a head 37 corresponding to head 1 with upwardly projecting lugs 38 located inside of the bars 39 which correspond to the bars 9 of the preferred form.

The openings 40 in the head 37 to receive the bars 39 are so positioned that the bars 39 close the openings 41 in the lugs 38, and hold the pin 42 against movement. This pin 42 serves as a coupling for the eye 43, while the eye 44 is coupled to the upper ends of the bars 39 by the bolt 45.

In other essential features, the construction is precisely the same as in the preferred form, and this modification is designed primarily for use with a particular type of car, while the preferred form is adapted for use in connection with almost any style of car or spring.

It will be noted particularly by reference to Fig. 1 that while the springs 20 are under compression, the spring 21 is slightly expanded. When additional strains or pressure is had downwardly upon the head 8, or upwardly upon the bars 9, springs 20 will be further compressed while spring 21 will contract. The tendency after such strain is for the springs 20 to rapidly expand or give what is known as a rebound. The spring 21 will overcome this rebound to such an extent that it will not be appreciable. In other words, the tendency of the springs 20 to suddenly expand is overcome by the constant contracting strain of spring 21, and this spring 21 therefore operates to control the rebound and cause the shock absorber to control the movement of the springs in both directions.

Various other slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

In a shock absorber, a head and a casing, said head having a groove in its outer edge co-extensive therewith, said casing having one end open and of substantially the same shape and contour as said head and adapted to snugly fit within said groove, lugs depending from the opposite side of said head within said casing and provided with alined perforations, said casing being provided on its opposite sides with perforations adapted to register with the perforations in said lugs when said casing is properly assembled with said head, securing bolts extending entirely through said casing and each being engaged at its opposite ends in said perforated lugs and casing perforations, a cross bar within said casing, springs interposed between said head and said cross bar and parallel members secured to said cross bar and projecting through said head, substantially as described.

In testimony whereof I have signed my name to this specification in the presence of two subscribing witnesses.

MARTIN T. CONVERY.

Witnesses.
V. P. PADULA,
CHAS. E. POTTS.

Copies of this patent may be obtained for five cents each, by addressing the "Commissioner of Patents, Washington, D. C."